United States Patent
Lutz et al.

[11] Patent Number: 5,691,588
[45] Date of Patent: Nov. 25, 1997

[54] DRIVE ARRANGEMENT FOR A HYBIRD VEHICLE

[75] Inventors: Dieter Lutz; Dieter Bauch-Panetzky, both of Schweinfurt; Reinhard Feldhaus, Oerlenbach-Ebenhausen; Wolfgang Thieler, Hassfurt, all of Germany

[73] Assignee: Fichtel & Sachs AG, Schweinfurt, Germany

[21] Appl. No.: 571,888

[22] PCT Filed: Jun. 21, 1994

[86] PCT No.: PCT/DE94/00759

§ 371 Date: Jan. 11, 1996

§ 102(e) Date: Jan. 11, 1996

[87] PCT Pub. No.: WO95/01885

PCT Pub. Date: Jan. 19, 1995

[30] Foreign Application Priority Data

Jul. 9, 1993 [DE] Germany ............ 43 23 602.2

[51] Int. Cl.⁶ ............................ H02K 49/00
[52] U.S. Cl. ............ 310/92; 310/67 R; 180/165; 290/38 R
[58] Field of Search .............. 310/92, 67 R; 290/38 R, 38 B, 47; 180/165

[56] References Cited

U.S. PATENT DOCUMENTS

| 4,626,696 | 12/1986 | Maucher et al. | 290/38 R |
| 4,868,436 | 9/1989 | Attilio et al. | 310/67 R |

FOREIGN PATENT DOCUMENTS

| 2925675 | 2/1981 | Germany. |
| 3338548 | 5/1985 | Germany. |
| 3737192 | 7/1988 | Germany. |

OTHER PUBLICATIONS

"Stand der Entwicklung von Elektro–Strassenfahrzeugen 1989 Allgemeine Problemkreise, Antriebssysteme, Energiespeicher"; A. Gahleitner; ÖZE, Jg. 42, H.5, May 1989, pp. 179–194.

Primary Examiner—Clayton E. LaBalle
Assistant Examiner—Timothy A. J. Williams
Attorney, Agent, or Firm—Cohen, Pontani, Lieberman & Pavane

[57] ABSTRACT

A drive arrangement for a hybrid vehicle with an electric motor, which has a rotor with a hub body and a stator, and with two engagable and disengagable dry-disk clutches. Each of the dry-disk clutches has a first functional component as well as a second functional component. The second functional component is frictionally connectable to the first functional component in order to provide a torque transmitting connection.

13 Claims, 3 Drawing Sheets

DRIVE ARRANGEMENT FOR A HYBIRD VEHICLE

BACKGROUND OF THE INVENTION

1. Field of the Invention

The invention relates to a drive arrangement for a hybrid vehicle and, more particularly, to a drive arrangement with an electric motor having an external rotor encased in a hub body, a stator, two dry-disc clutches located across from each other on different axial faces of the hub body, each clutch having first and second functional components, the first functional components being non-rotatably connected to either the crank shaft or the gear shaft of an internal combustion engine, the second functional components being non-rotatably connected to the rotor, and the first and second functional components frictionally engaging each other and the dry-disc clutches in a torque transmitting connection.

2. Description of the Prior Art

A hybrid drive for a motor vehicle is known in the art and described in German Patent Application No. DE 37 37 192 A1. This motor has internal combustion engine and an electric motor designed as an asynchronous machine. The rotor of the electric motor can be connected to the crank shaft of the internal combustion engine via a first dry-disc separation clutch and to the input shaft of the gear via a second separation dry-disc clutch. The internal combustion engine has no flywheel of its own. Instead, the rotor of the electric motor can be used as the flywheel mass for the internal combustion engine when the first clutch is closed. The rotor of the electric motor, which is located inside of the stator, has a hub body that is arranged on the side facing the gear and mounted on the gear input shaft. It is very massive in design and thus constitutes a large part of the flywheel mass. The hub body forms the support for the clutch disc of the second separation clutch, which establishes the frictional connection between the rotor and the gear input shaft. The first separation clutch is located on the face of the electric motor facing the internal combustion engine. The clutch disc of this first separation clutch is non-rotatably connected fashion to the crank shaft. In order to establish a frictional connection in the engaged state the first separation clutch has an annular shaped support, also of massive design, which is connected rigidly to the rotor. The two separation clutches are thus arranged next to one another on the same side of the hub body. The output of the electric motor, which functions as a generator when the hybrid vehicle is operated by the internal combustion engine alone, i.e. both separation clutches closed and feeds the vehicle battery and other electric consumers, is equal to only a relatively small fraction of the output of the internal combustion engine and totals, for example, 7 kW. For this reason, the driving power during purely electric operation (first separation clutch opened between rotor and crank shaft; second separation clutch closed) is correspondingly modest. The electric motor in this hybrid vehicle is also meant to be able to act as a starter for the internal combustion engine. Due to the low output and the relatively low torque that can be produced, however, direct start-up from a stoppage of the electric motor is not always possible. Therefor, the electric motor is initially brought to a relatively high rotational speed with the separation clutches open, so as to store a considerable quantity of energy in the rotating flywheel mass of the rotor. Only then is the first separation clutch between the rotor and the crankshaft engaged, jerkily, so that the internal combustion engine is revved up to above its starting speed and can then continue to run automatically. Along with these relatively poor conditions for starting the internal combustion engine, this drive unit has a relatively large axial structural length, which can be an obstacle to installation in standard engine/transmission units.

The object of the invention is therefore to further develop a generic drive arrangement in such a way that the output capacity of the electric motor is increased and the start-up of the internal combustion engine is improved. In doing this, a primary goal is to keep the axial structural length as small as possible.

SUMMARY OF THE INVENTION

Starting from the known drive arrangement, the invention calls for an electric motor designed having an external rotor and preferably having a permanent magneto-electric rotor and electronically commutated power supply of the stator windings. This ensures significantly higher torques as well as better efficiency. Furthermore, two dry-disc clutches, which are advantageously equipped with automatic actuation (e.g., hydraulic, pneumatic or electromechanical), are located opposite one another on different sides of the hub part if the rotor. Thus, the hub part lies between the two clutches and, in an especially preferred embodiment of the invention, directly provides for both clutches a support function (second functional component) for both clutch discs (first functional component), which are non-rotatably connected to the crank shaft of the internal combustion engine and/or to the gear input shaft of the drive arrangement. The second functional component of both of the dry-disc clutches is thereby advantageously designed as a single piece with the hub part, especially as a thin-walled body that is essentially cylindrically shaped and is produced, for example, as a comparatively thin-walled sheet metal part or cast part. In this solution, the support of the two clutch discs is formed from the same structural part in an especially space-saving manner. It is merely necessary that the wall thickness of the hub part in this area be such that the frictional energy associated with the maximum torque of the internal combustion engine or the electric motor (if higher) can be absorbed and diverted during the coupling process. The flywheel mass of this electric motor can be relatively much lower, because it can produce significantly higher torque and an accordingly higher output, even making it possible, as a rule, to start the internal combustion engine from a stopped electric motor without first bringing the electric motor to a high speed in order to store energy.

The hub part of the rotor can be mounted either on the crank shaft or on the gear input shaft. Mounting on the crank shaft is preferred. In either case, the rotor bearing lies between the two dry-disc clutches. It is advisable to provide at least one of the dry-disc clutches with elements (which are known themselves) to dampen the torsional vibrations, in order to improve driving comfort during operation with the internal combustion engine. It is also possible to dampen torsional vibrations by suitably varying the actual electric load, which is controlled by a superordinated electronic controller, in the sense of an offset of the torsional vibrations.

The design of an electric motor having an external-rotor motor and a permanent magneto-electric rotor allows the rotor to be executed as a annular-shaped body of especially slight thickness (difference between inner and outer diameter), so that while the total diameter of the motor remains the same, the air gap between the rotor and the stator clearly moves further to the outside, permitting higher torques to be produced. At the same time, the mass of the magnetic ring acts upon a large diameter, so that considerable flywheel moment is achieved with relatively small mass, ensuring good concentricity of the internal combustion engine. In addition, the principle of the external rotor also permits the design of the electric motor to have a relatively short in the axial dimension. The drive arrangement is especially compact when the core assembly of the stator windings has a large and substantially cylindrical recess around the longitudinal axis of the electric motor (up to the vicinity of the windings) and the hub part of the rotor has a central outward bulge in such a form that at least one of the two dry-disc clutches lies inside of the structural space encompassed by the starer.

Instead of mounting the rotor directly on the crank shaft or the gear input shaft, a less preferred indirect mounting may be carried out. For example, this can be accomplished as follows: the clutch disc of one of the two dry-disc clutches, preferably the dry-disc clutch facing the internal combustion engine, is fixed and non-rotatably connected to the hub body of the rotor, and the rotor bearing is located in the connection region. The rotor bearing rests on the structural component forming the support of this clutch and is fixedly connected to the crankshaft via the clutch housing. In the case of indirect mounting on the gear input shaft, the clutch housing of the second dry-disc clutch would correspondingly be fixedly connected to the gear input shaft.

Another alternative is to mount the rotor on the starer. This can be done in such a way that the clutch disc of the first dry-disc clutch is in turn connected to the hub body of the rotor and the rotor bearing is located in the connection region. The rotor bearing rests on an essentially cylindrical carrying part, which is attached to the starer and extends from the outside into the intermediate space between the clutch disc of the first dry-disc clutch and the hub body. Finally, in a little preferred manner, it is also possible to mount the rotor via the casing of the internal combustion engine or the casing of the gear.

BRIEF DESCRIPTION OF THE DRAWING

The invention is described below in greater detail with reference to the examples of the drive arrangements in accordance with the invention and is shown schematically in FIGS. 1 to 3. In the drawings in which like numbers are used to denote similar elements.

DETAILED DESCRIPTION OF THE PRESENTLY PREFERRED EMBODIMENTS

Figure 1:
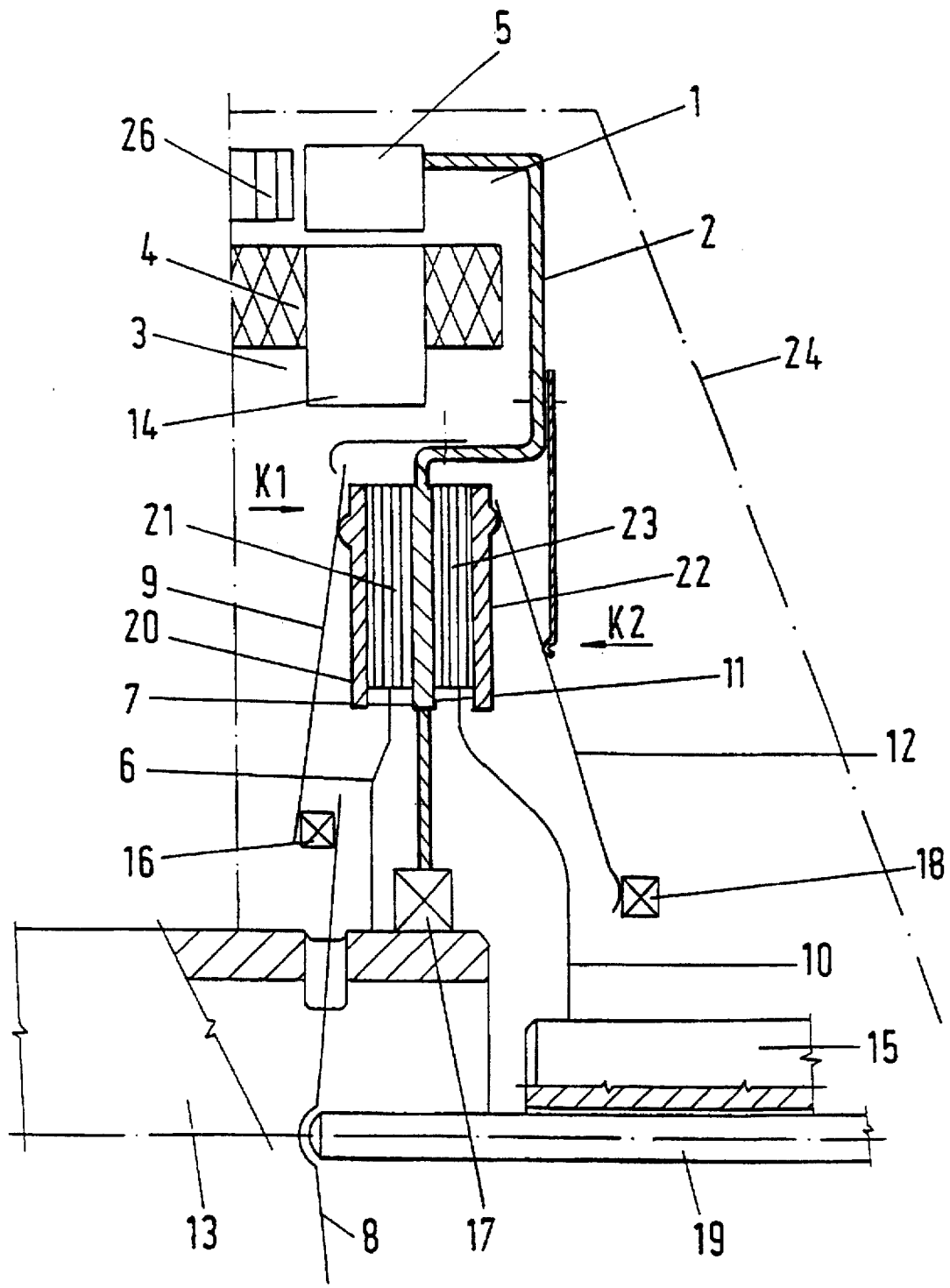
FIG. 1 is a cross-sectional view of the drive unit in accordance with the present invention with the second functional components of the clutches integrated into the hub body as a single element.

The drive arrangement shown in FIG. 1 consists of an electric motor that can be operated both as an electric motor and as a generator. The drive arrangement further consists of two dry-disc clutches K1 and K2 and is located inside of a gear bell 24. The electric motor is designed as a permanent magneto-electric d.c. motor with electronic commutation and has an external rotor 1 which is equipped with a plurality of permanent magnets 5 of alternating polarity and high field strength (preferably made of an FeNdB or an SmCo alloy). In order to furnish the electronic controller (not shown) in a timely manner with the information about the relative angular position between the stator magnetic poles and the permanent magnetic poles needed for commutation, a resolver system 26 is provided. The stator 3, the windings of which are identified by reference number 4, has a core assembly 14, having an axially continuous cylindrical recess around the longitudinal axis of the electric motor that reaches to near the windings 4. The stator 3 is connected, in a manner not described in greater detail, to the casing of the internal combustion engine, which is also not. The only part shown of the internal combustion engine shown in the Figures is the final or end piece of the crank shaft 13. On its right face, the rotor 1 has a cylindrical hub body 2, which is rotatably mounted via rotor bearings 17 on the crank shaft 13 between the two dry-disc clutches K1, K2. Alternatively, of course, the stator 3 could also be attached to the gear bell 24. In this case, the hub body 2 would be moved to the left face of the rotor 1 and the resolver 26 would advantageously be attached to the gear bell 24. The clutch disc 6 of the first dry-disc clutch K1 is non-rotatably connected to the crank shaft 13. The clutch disc 6 is equipped on both sides with friction linings 21. In the engaged position a diaphragm spring 9 presses the friction linings 21 via a pressure plate 20 against the hub body 2 functioning as a support 7-i.e. the hub body 2 having a corresponding friction surface-of the rotor 1. The frictional connection resulting from this can be released by moving a disconnecting element 19 to the left, which causes a plate-like disconnecting device 8 to counteract the pressure force of the diaphragm spring 9 via the disconnection bearing 16. In the engaged position a constant frictional connection is established between the crank shaft 13 and the rotor 1 via the dry-disc clutch K1. Because the hub body 2 is provided with a protuberance pointing to the left, which extends into the cylindrical recess of the stator core assembly 14, the clutch K1 can be completely integrated into the structural area encompassed by the stator 3. On the opposite axial face of the hub body 2, the second dry-disc clutch K2 is located. As its first functional component, this clutch K2 has a clutch disc 10, which is provided on bath sides with friction linings 23 and is non-rotatably connected to the gear input shaft 15. The second functional component 11 of the clutch K2, which forms the support for the friction linings 23 of the clutch disc 10, is again intergral with the hub body 2. In the engaged clutch position, the friction linings 23 are continually pressed against the hub body 2 by means of the diaphragm spring 12 via the pressure plate 22 and establish a frictional connection between the rotor I and the gear input shaft 15. By moving the disconnection bearing 18 to the left (activation elements are not shown in greater detail), it is possible to release this frictional connection.

In order to dampen the torsional vibrations, it is possible to provide, in a known manner, torsional damping elements (not shown), which advantageously are integrated into the clutch disc 10 of the second dry-disc clutch K2. In addition or alternatively, the clutch disc 6 of the first clutch K1 can also be provided with such torsional damping elements.

Figure 2:
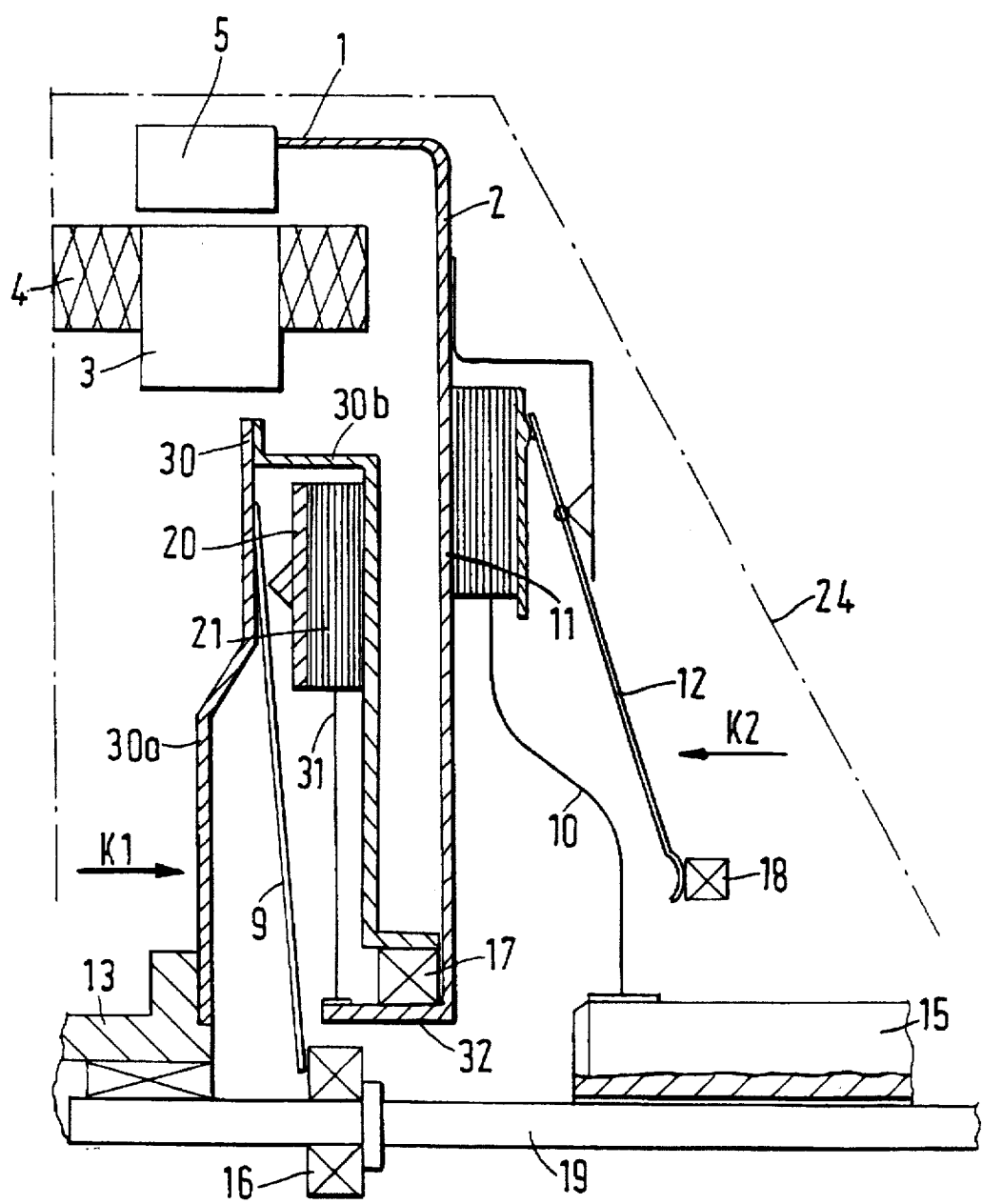
FIG. 2 is a cross-sectional view of the drive unit in accordance with the present invention with the hub body mounted indirectly on the crank shaft.

With respect to the electric motor, the embodiment in FIG. 2 is largely the same as that shown in FIG. 1, so similar elements will not be discussed again here. The design and arrangement of the dry-disc clutch K2 also corresponds to FIG. 1, while the clutch K1 differs. The first functional component 30 of clutch K1 is formed by a clutch casing 30a fixedly connected to the crank shaft 13 and to a support 30b, which is fixedly connected to the clutch casing 30a and has a generally cylindrical shape. The clutch disc 31 is fixedly connected via a hollow cylindrical connecting piece 32 to the hub body 2 of the rotor 1. The roller bearing 17 for mounting the rotor 1 sits externally on the connecting piece 32. In the outward direction, the rotor bearing 17 rests on the end of the support 30b, which has been shaped into a bearing seat and extends from the outside into the intermediate area formed between the clutch disc 31 and the hub body 2.

In the engaged position, the diaphragm spring 9 presses the clutch disc 31 and the friction linings 21 against the support 30b via the pressure plate 20 thereby establishing a frictional connection, transmitting torque from the crank shaft 13 to the hub body 2 via the clutch casing 30a, the clutch disc 31 and the connecting piece 32. Clutch K1 is disconnected by moving the disconnecting element 10 to the left.

Figure 3:
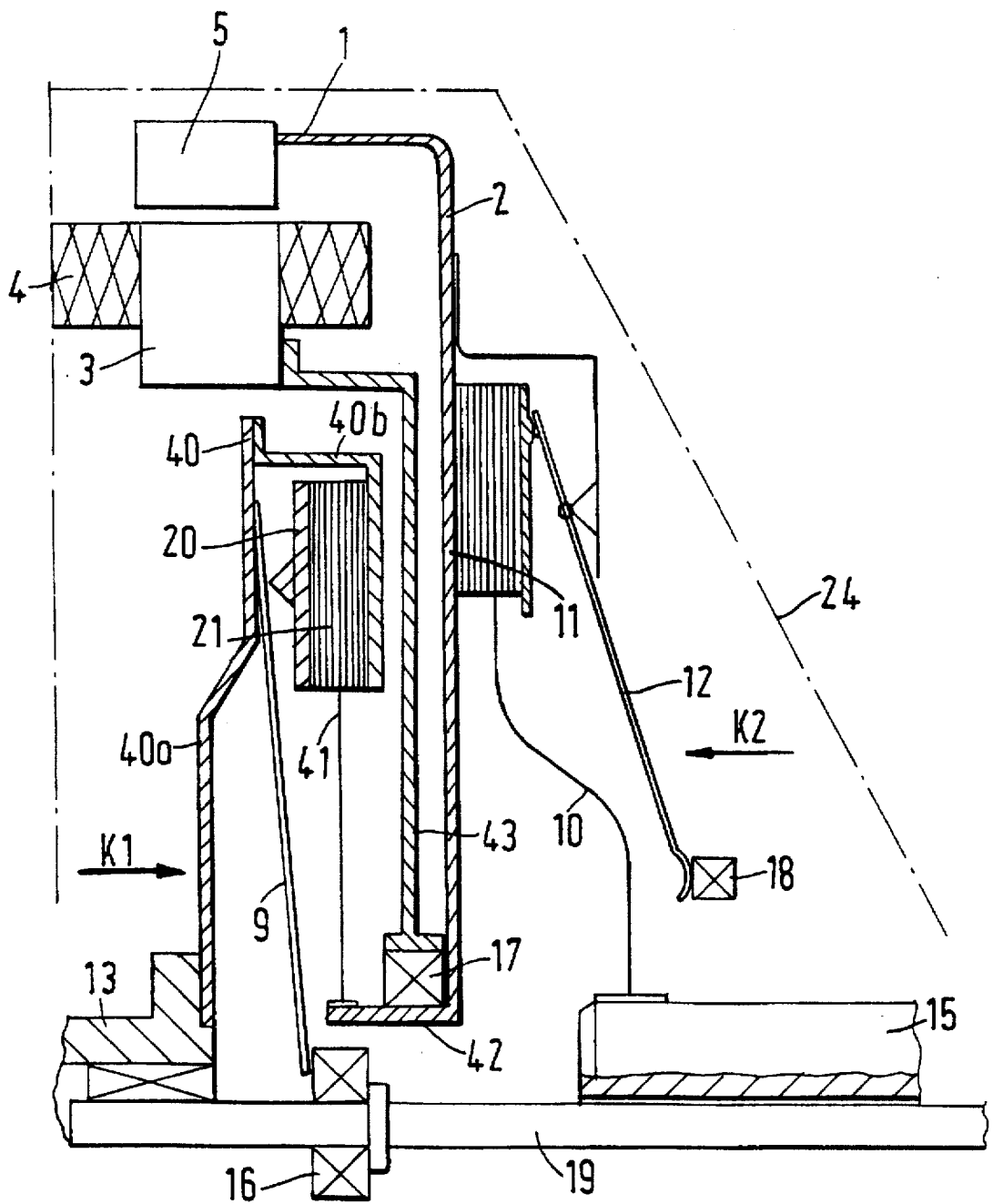
FIG. 3 is a cross-sectional view of the drive unit in accordance with the present invention with the hub body mounted on the stator.

The structure of the drive arrangement in FIG. 3 is essentially the same as to that in FIG. 2. As in FIG. 2, it is not the clutch disc (as in FIG. 1), but rather the clutch casing 40a that is non-rotatably connected to the crank shaft 13 as a part of the first functional component 40 of the clutch K1. The clutch casing 40a continues in the support 40b of the clutch K1. As in FIG. 2, the clutch disc 41 is again fixedly connected to the hub body 2 of the rotor 2 via a hollow cylindrical connecting piece 42, and the rotor bearing 17 rests on this connecting piece 42. In the outward direction, the rotor bearing 17 is supported via a generally cylindrically carrying part 43, which is connected to the stator 3. The frictional connection is established and released in the same manner as in FIG. 2. The sole difference in this embodiment of the invention; as compared to FIG. 2, is the type of rotor mounting.

Embodiments of the drive arrangement according to the invention are also possible in which, in contrast to FIG. 1, it is not the clutch K1 but rather the clutch K2 that has been modified, in the same manner as clutch K1 in FIGS. 2 and 3, i.e., the assignments of the two functional components of the clutch K2 to the hub body 2 of the rotor 1 and to the gear input shaft 19 are reversed. In general, it should be noted that the clutches K1 and K2 can be actuated in any manner desired. The clutches may be "pressed" or "pulled"; their engagement and disengagement may be purely mechanical, as in FIGS. 1-3, or may use pressure-operated piston/cylinder units or even an electric motor or electro-magnetic drive.

In the particularly preferred embodiment shown in FIG. 1, the drive arrangement according to the invention is able to provide electric drive power at high torque. This drive arrangement also has a very low weight relative to its output. It permits the internal combustion engine to be started without prior revving up, i.e. without temporary decoupling of the rotor from the crank shaft. The higher power capacity of the electric motor makes it possible to produce a correspondingly higher braking moment and a more effective resupply of energy into the vehicle battery during coasting operation of the hybrid vehicle. The higher efficiency of the preferred permanent magneto-electric motor, as compared to asynchronous motors, also constitutes an important advantage. The driving power of the hybrid vehicle in a purely electric operation are substantially better than those of the vehicle described initially.

We claim:

1. A drive arrangement for a hybrid vehicle comprising: an electric motor including an external rotor having a cylindrically shaped hub body and a plurality of permanent magnets;

a rotor bearing; and a stator;

an internal combustion engine including a casing and a crank shaft;

a drive train including a casing and a gear input shaft; and first and second actuatable clutches positioned on opposing axial faces of said hub body, each clutch having first and second functional components, said first functional component of said first clutch being non-rotatably connected to said crank shaft, said first functional component of said second clutch being non-rotatably connected to said gear input shaft, said second functional component of both said first and second clutches being non-rotatably connected to said hub body of said external rotor, and wherein said rotor bearing is disposed in a position selected from the group consisting of (a) between said first and second clutches (b) on said casing of said internal combustion engine and (c) on said casing of said drive train.

2. The drive arrangement of claim 1, wherein said rotor is mounted to one of said crank shaft and said gear input shaft.

3. The drive arrangement of claim 1, wherein said first clutch includes a cylindrically shaped carrying element fixedly connected to said stator and extending into an annular area formed by said second functional component of said first clutch and said hub body, and a cylindrical connecting piece connected to said hub body, said rotor bearing being positioned between said carrying element and said cylindrical connecting piece.

4. The drive arrangement of claim 1, wherein said first functional component includes a clutch casing connectable to said crank shaft and a cylindrically shaped support connected to said clutch casing, wherein said first clutch includes a cylindrical connecting piece connected to said hub body, and wherein said rotor bearing is positioned between said hub body and said cylindrical connecting piece.

5. The drive arrangement of claim 2, wherein said hub body, said second functional component of said first clutch and said second functional component of said second clutch are integrally formed.

6. The drive arrangement of claim 1, wherein said hub body is cylindrically shaped and includes sheet-like walls.

7. The drive arrangement of claim 6, wherein said hub body is formed of sheet metal.

8. The drive arrangement of claim 1, wherein said stator occupies a structural volume defined within said arrangement and includes electric windings and a core assembly defining a continuous central cylindrical recess extending to a point adjacent said windings, said hub body defining a central outward bulge whereby at least one of said first and second clutches is positioned within said structural volume encompassed by said stator.

9. The drive arrangement of claim 1, wherein said stator windings are powered through electronic commutation of said rotor.

10. The drive arrangement of claim 1, wherein at least one of said first and second clutches includes torsional vibration damping elements.

11. The drive arrangement of claim 1, further comprising means for actuating said first clutch, said first clutch facing said internal combustion engine, said actuating means extending through said gear shaft.

12. The drive arrangement of claim 11, wherein said actuating means comprises a hollow shaft.

13. The drive arrangement of claim 1, further comprising a means for actuating said first clutch, said first clutch facing said internal combustion engine, said actuating means comprising a pressurized piston/cylinder unit actuated by a pressure medium.

* * * * *